United States Patent [19]

Tobey

[11] 4,173,507

[45] Nov. 6, 1979

[54] SEPARATING LAMINATED LAYERS

[75] Inventor: Frederic S. Tobey, Brewster, Mass.

[73] Assignee: W. H. Brady Co., Milwaukee, Wis.

[21] Appl. No.: 851,685

[22] Filed: Nov. 15, 1977

[51] Int. Cl.² .......................... B31F 1/00; B32B 31/00
[52] U.S. Cl. .................................... 156/443; 156/510; 156/584
[58] Field of Search .................... 156/510, 443, 584

[56] References Cited

U.S. PATENT DOCUMENTS

| | | | |
|---|---|---|---|
| 1,869,550 | 8/1932 | Dorogi et al. | 156/510 |
| 2,550,455 | 4/1951 | Davies | 156/443 |
| 3,266,797 | 8/1966 | Stievenart | 271/64 |
| 3,752,099 | 8/1973 | Hunter et al. | 156/443 |

Primary Examiner—Douglas J. Drummond

[57] ABSTRACT

Laminate layers, such as a label and its liner, are separated by bending lengthwise-adjacent portions of the laminate end in opposite directions to cause shearing and lengthwise offset between the layers, and then releasing the end, the overall orientation being such that, upon release of the end, a differential in the forces that tend to straighten the layers drives apart the shear-weakened adhesive bond. The bending is carried out by forcing the laminate end into a narrow cavity with a finger-like member and using the combination of a compressible member and a support to frictionally restrain the laminate longitudinally. In preferred embodiments layer separation means are combined with cutting members for severing a length of laminate from a larger piece thereof.

7 Claims, 5 Drawing Figures

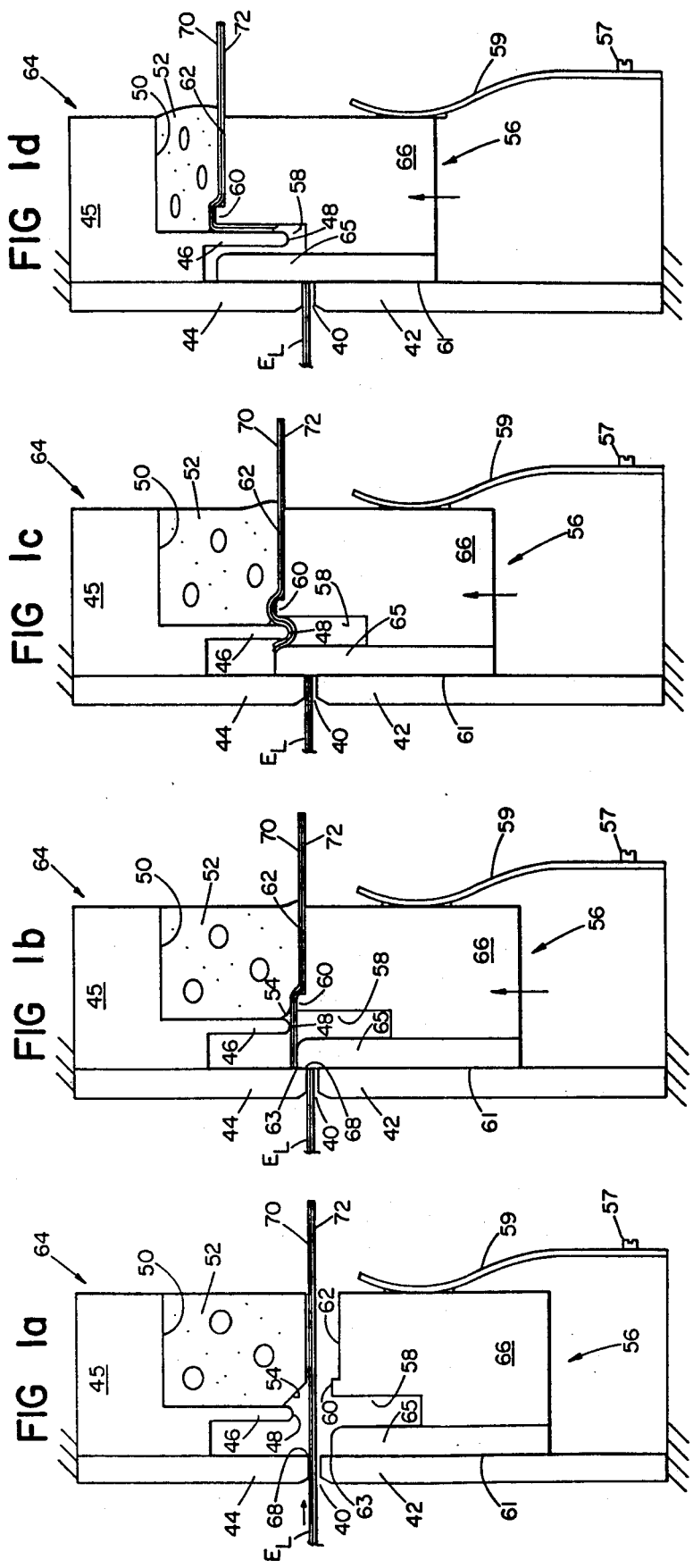
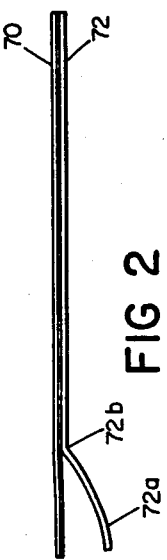

SEPARATING LAMINATED LAYERS

FIELD OF THE INVENTION

This invention relates to separating element layers from other layers to which they are adhered; e.g., to removing labels from liners.

BACKGROUND OF THE INVENTION

It is well known in the art to remove labels adhered with pressure-sensitive adhesive to a continuous liner by directing the liner around a sharp bend so that the stiffness of the label in tending to resist bending imposes forces in tension causing at least partial separation of the label leading edge; e.g., Cole U.S. Pat. No. 2,754,994. Employing this principle necessitates maintaining guide control of a portion of the liner downstream (i.e., in advance) of the leading edge of the label.

I have disclosed in my recently filed U.S. patent application entitled Separating Laminated Layers, and hereby incorporated by reference, that leading edges of discrete elements such as label layers may be removed from liner layers to which they are adhered by directing both layers at an end of an element-liner laminate around a sharp bend to cause shearing and lengthwise offset between the layers, and then releasing the end, the overall orientation being such that, upon release of the end, a differential in the forces that tend to straighten the layers drives apart the shear-weakened adhesive bond.

In a U.S. patent application recently filed by Robert H. Parker, entitled Separating Laminated Layers, and hereby incorporated herein by reference, there is disclosed practice of my method by bending lengthwise-adjacent portions of the laminate end in opposite directions to produce the shearing and lengthwise offset between layers. Parker's invention included the general conception of using a finger-like element to force the end portion of the laminate into a cavity to produce a 90° bend in one direction next to a 180° bend in the opposite direction.

SUMMARY OF THE INVENTION

The present invention features, in one aspect, apparatus for practicing Parker's double bending method by longitudinally restraining the laminate between a support surface and a compressible member while a finger-like element forces a portion of the laminate into a cavity to carry out the bending. In another aspect the invention features severing a length of the laminate from a longer piece thereof while separating layers of the severed length by bending as described.

In one preferred embodiment a closed cell Neoprene block cooperates with a ridged support member to provide enhanced longitudinal restraint of the laminate as it is severed and bent.

PREFERRED EMBODIMENT

I turn now to a presently-preferred embodiment of the invention.

DRAWINGS

There is shown in:

FIGS. 1(a)–(d) four side-view steps in the use of a most preferred embodiment; and FIG. 2 a side view of a label-liner element after removal from the step of FIG. 1(d).

DESCRIPTION

The embodiment described in the drawings and its operation are now described.

1. Embodiment

In FIGS. 1(a)–(d) is shown an end $E_L$ from a continuous roll of label-liner laminate (0.010 inches thick) entering through slot 40 between stationary metal portions 42 and 44. Secured to portion 44 is Delrin element 45 including depending plate portion 46 (0.035 inches in thickness and 0.203 inches long) and with semi-cylindrical end 48. Secured to horizontal surface 50 of element 45, is block 52 of closed cell Neoprene (material manufactured by Irving B. Moore Corp., Cambridge, Mass. under its No. R431-N) downwardly relieved by inclined planar surface 54. Block 52 is 0.325 inches high, 0.260 inches wide at its top, and 0.214 inches wide at its bottom, and surface 54 begins 0.046 inches from the bottom. Beneath the elements just described is a vertically reciprocable deforming and cutting element indicated generally at 56, in the upper portion of which is groove 58, 0.065 inches in width and 0.233 inches deep, defined between metal blade 65 and Delrin element 66 secured to blade 65 (by means not shown). Just downstream of groove 58, in Delrin element 66, are ridge 60 (0.015 inches high, 0.045 inches wide) and flat 62 (0.205 inches wide). Leaf spring 59, held in place by screws 57 (only one shown), biases surface 61 including cutting edge 63 against the inner surface of portion 42, and slides easily on the low-friction surface of Delrin portion 66.

2. Operation

In operation, label laminate end $E_L$ is moved as part of a roll through slot 40 and between the upper and lower cutting and deforming units, indicated generally at 64 and 56. When it is positioned to provide the desired length of finished label, cutting and deforming unit 56 is moved upwardly as shown successively in FIGS. 1(b) through (d). First, as shown in FIG. 1(b), the label is cut between edges 63 and 68, which are at an angle of 8° for good "scissoring" or guillotine shearing action. The semi-cylindrical surface 48 then engages the upper surface of the label laminate, against label layer 70. The curved and slippery character of surface 48 counteracts any tendency to draw material in an upstream direction past ridge 60. Sponge element 52, which clamps the downstream end of the label laminate against movement in an upstream direction, beginning even as plate 46 engages the laminate, is compressed further and further, to hold with more and more force, to prevent upstream movement of the laminate into the slot 58. Ridge 60 is of great help to this end. The relief at surface 54 prevents the sponge from being forced into slot 58. A bend in the laminate of 180° is produced around surface 48, and a sharper bend of 90° in the opposite direction is produced around the 90° sharp upstream edge of ridge 60, as shown in FIGS. 1(c) and 1(d). It is important that in this final stage the end be able to free itself of control by the semi-cylindrical edge, as by fixing its length to assure clearing (FIG. 1(d)). The product is shown in FIG. 2, the label 70 with its greater memory having gone back toward straight, and the liner 72 retaining at 72a much of the bend given it during the movement around the plate, as well as a sharper bend 72b in the opposite direction given it at ridge 60, the tension resulting from the latter having caused the bond weakened by the shear created in bending to snap apart at the stage shown in FIG. 2, even though the liner memory at 72a urges it toward label 70.

I claim:

1. Apparatus for separating layers of a laminate at an end thereof, comprising means for bending said layers sharply in one direction at one portion of said end, and bending said layers in the opposite direction at a lengthwise adjacent portion of said end, to cause shearing and lengthwise offset between said layers, and then releasing said end, a differential in the forces that tend to straighten the layers causing said layers to separate upon their release from said means, said means comprising a first portion providing a narrow cavity and a support surface adjacent thereto, and a second portion providing a finger-like member, narrower than said cavity, and, adjacent to said finger-like member, a compressible member, one of said portions being mounted for movement toward the other with an end portion of said laminate therebetween, to cause said finger-like member to force said end portion of said laminate into said cavity while said compressible member holds an adjacent portion of said laminate against said support surface to restrain said laminate longitudinally.

2. Apparatus according to claim 1 wherein said compressible member is rubbery.

3. Apparatus according to claim 2 wherein said compressible member is closed cell Neoprene.

4. Apparatus according to claim 1 wherein said finger-like member has a slippery, rounded end for contacting said laminate.

5. Apparatus according to claim 1 wherein said support surface is stepped to provide a ridge directly adjacent said cavity, said ridge having a sharp edge for cooperating with said finger-like member to sharply bend said laminate in said one direction, said ridge cooperating with said compressible member to enhance the longitudinal restraint of said laminate.

6. Apparatus according to claim 1 wherein said compressible member is relieved to provide space between said finger-like member and the end of said compressible member that faces said support surface, to prevent said finger-like member from forcing said compressible member into said cavity.

7. Apparatus according to claim 1 further comprising cutting members respectively secured to said first and second portions of said means for bending, said cutting members being on the opposite sides of said portions from said compressible member and said support surface, and being mounted to cut off from a long piece of said laminate a length including said end.

* * * * *